United States Patent [19]

McAlpin et al.

[11] Patent Number: 5,571,619

[45] Date of Patent: Nov. 5, 1996

[54] FIBERS AND ORIENTED FILMS OF POLYPROPYLENE HIGHER α-OLEFIN COPOLYMERS

[75] Inventors: James J. McAlpin, Houston; Glenn A. Stahl, Humble, both of Tex.

[73] Assignee: Exxon Chemical Patents, Inc., Wilmington, Del.

[21] Appl. No.: 247,952

[22] Filed: May 24, 1994

[51] Int. Cl.$^6$ .................................................. D02G 3/00
[52] U.S. Cl. ..................... 428/364; 428/395; 526/124; 526/352; 526/194; 526/212; 526/901; 526/904; 526/138; 526/125.8; 502/103; 502/104; 502/113; 502/118
[58] Field of Search ....................... 428/364, 395; 502/104, 103, 117, 120, 113, 118, 129, 132, 133; 526/129, 120, 901, 904, 352, 138, 88, 125, 67, 68, 194, 212

[56] References Cited

U.S. PATENT DOCUMENTS

| | | |
|---|---|---|
| 4,291,092 | 9/1981 | Weiner . |
| 4,297,411 | 10/1981 | Weiner . |
| 4,316,970 | 2/1982 | Hughes . |
| 4,339,469 | 7/1982 | McDonie . |
| 4,340,641 | 7/1982 | Weiner . |
| 4,390,385 | 6/1983 | Ferguson . |
| 4,643,945 | 2/1987 | Kiang et al. . |
| 4,808,561 | 2/1989 | Welborn, Jr. .................. 502/104 |
| 4,921,920 | 5/1990 | Collomb-Ceccarini et al. ....... 526/125 |
| 4,988,781 | 1/1991 | McKinney et al. .................. 526/68 |
| 5,017,714 | 5/1991 | Welborn, Jr. .................. 556/12 |
| 5,055,438 | 10/1991 | Canich .................. 502/117 |
| 5,145,819 | 9/1992 | Winter et al. .................. 502/117 |
| 5,188,885 | 2/1993 | Timmons et al. . |
| 5,198,401 | 3/1993 | Turner et al. . |
| 5,213,881 | 5/1993 | Timmons et al. .................. 428/224 |
| 5,240,894 | 8/1993 | Burkhardt et al. .................. 502/108 |
| 5,254,394 | 10/1993 | Bothe et al. . |
| 5,278,119 | 1/1994 | Turner et al. . |
| 5,296,434 | 3/1994 | Karl et al. .................. 502/117 |

FOREIGN PATENT DOCUMENTS

| | | |
|---|---|---|
| 0 129 368 A1 | 12/1984 | European Pat. Off. . |
| 0 318 049 A1 | 11/1988 | European Pat. Off. . |
| 0 320 762 A2 | 6/1989 | European Pat. Off. . |
| 0 495 099 A1 | 12/1989 | European Pat. Off. . |
| 0 495 099 A1 | 7/1992 | European Pat. Off. . |
| 0 538 749 A1 | 10/1992 | European Pat. Off. . |
| 0 518 092 A2 | 12/1992 | European Pat. Off. . |
| 0 519 237 A2 | 12/1992 | European Pat. Off. . |

OTHER PUBLICATIONS

*OrganoMetallics*, v. 13, No. 3, 1994, pp. 954–963.
*Journal of Org. Che.*, 288 (1985) 63–67 "Synthesis and Crystal Structure of a Chiral ansa–Zirconocene Derivative with Ethylene–bridged Tetrahydroindenyl Ligands", F. Wild, M. Wasiucionek, G. Huttner and H. Brintzinger.

*Primary Examiner*—Patrick J. Ryan
*Assistant Examiner*—Merrick Dixon
*Attorney, Agent, or Firm*—Douglas W. Miller

[57] ABSTRACT

A propylene, α-olefin copolymer, where the α-olefin has 5 or more carbon atoms made with a metallocene catalyst system provides substantially higher cold flow resistance from when the propylene copolymer is made with an α-olefin having 4 or less carbon atoms. Other properties such as ultimate tensile strength and impact strength are substantially higher as well. Such polymers can be used to advantage in fibers, fabrics, and oriented films.

17 Claims, 1 Drawing Sheet

FIBERS AND ORIENTED FILMS OF POLYPROPYLENE HIGHER α-OLEFIN COPOLYMERS

TECHNICAL FIELD

This invention relates generally to fibers, fabrics, oriented films and other products made from propylene-α-olefin copolymers that exhibit exceptional physical properties. The physical properties include high strength, toughness, and relatively low cold flow or creep. More specifically this invention relates to the use of certain propylene-α-olefin copolymers where the α-olefin is selected from olefins having 5 or more carbon atoms and the copolymer is formed utilizing a metallocene catalyst system.

BACKGROUND

Polyolefin polymers are well known articles of commerce. The uses of polyolefins are many and well known to those of skill in the art. Polyolefins have many useful physical properties. However, in many applications polyolefins display unacceptable cold flow properties, that is, at room temperature or service temperature, they exhibit flow when subjected to low levels of stress for an extended period. Cold flow resistance is a property of importance in many polymer applications. Cold flow is defined as the permanent or non-recoverable deformation of a polymeric article in response to a force or stress (lower than the yield stress) applied for an extended time at a selected temperature. Different polymers will exhibit different resistances to cold flow.

Polypropylene homopolymers and copolymers have come into wide use. Over 5 million tons (4 million metric tons) of polypropylene are manufactured each year in the United States alone. Polypropylene has a wide range of commercial uses, from packaging films and sheeting to molded food containers and fibrous constructions employed in diapers and hospital drapes, wraps, and gowns.

There are several classes of polypropylene. One of these classes is statistical copolymers of propylene and other olefins, sometimes also known as random copolymers. In the past this class has tended to be represented largely by copolymers of propylene and ethylene, usually made using Ziegler-Natta catalysts. Copolymerization of higher alpha-olefins (HAO) (those alpha-olefins of 5 or greater carbon atoms) with propylene, using Ziegler-Natta catalysts has been problematic in the past due to the lower reactivity of these catalysts towards higher alpha-olefins. The Ziegler-Natta catalyzed ethylene copolymers have generally found use based on their substantially different properties when compared to Ziegler-Natta catalyzed polypropylene homopolymers. Broadly, the differences between Ziegler-Natta catalyzed homopolymers and propylene-ethylene copolymers are seen in such copolymer properties as lower melting point, greater flexibility, better clarity, slightly improved toughness, softness in products like nonwoven diaper cover stock and/or improved resistance to degradation when exposed to high energy radiation e.g. gamma-rays, ultraviolet, or electron-beam.

EP 0 495 099 A1 to Mitsui Petrochemical Industries discloses a method for polymerization of the propylene α-olefins utilizing metallocene-alumoxane catalyst systems. This document also discloses a propylene α-olefin copolymer where the propylene is present from 90–99 mole % and the α-olefin is present from 1–10 mole %. This document discloses that the propylene α-olefin copolymers would have a narrow molecular weight distribution (Mw/Mn), the copolymer would have a low melting point, and the copolymers have excellent softness. The document also discloses a straight line relationship between $T_m$ and propylene content, however, no distinction is drawn to the melting point depression effect of different α-olefins.

EP 0 538 749 A1 to Mitsubishi Petrochemical Co. discloses a propylene copolymer composition to produce a film having excellent low-temperature heat sealing, where the composition has 1 to 70 wt % of A and 30–99 wt % of B where:

A is a propylene-ethylene or α-olefin copolymer where the α-olefin has 4–20 carbon atoms and a $M_w/M_n$ of not more than 3.

B is a propylene-ethylene or α-olefin copolymer where the α-olefin has 4–20 carbon atoms and a $M_w/M_n$ of 3.5 to 10.

Copolymer A is polymerized by a metallocene catalyst system.

Copolymer B is polymerized by a Ziegler-type catalyst.

Substantially all examples utilize propylene-ethylene copolymers or propylene homopolymers.

EP 0 318 049 A1 to Ausimont discloses crystalline copolymers of propylene with minor portions of ethylene and/or α-olefins. The copolymers are disclosed to have very good mechanical properties. The copolymers are polymerized in the presence of methyalumoxanic compounds. The examples of this document show propylene-ethylene and propylene-butene-1 copolymers.

U.S. Pat. No. 5,188,885 to Kimberly Clark Corporation discloses a fabric laminate that is softer, stronger, more abrasion resistant and has reduced particle emissions compared to fabric laminates that are thermally spot bonded made from isotactic polypropylene. The fabric laminate has at least some layers formed from an olefin copolymer, terpolymer or blends of olefin polymers. Where the olefinic polymers have a crystallinity of less than 45%, preferably between 31–35%. It is disclosed that such a polymer has a broadened melt temperature range. In an embodiment a random propylene copolymer can be formed by copolymerizing 0.5 to 5 weight % of ethylene into a propylene backbone, preferred is 3 wt % ethylene. Further this document discloses that unless a melt temperature differential of about 10° C.–40° C. exists between the spun-bonded and melt-blown layers, bonding will not be optimum and strength will be reduced.

U.S. Pat. No. 5,213,881 to Kimberly Clark Corporation discloses a nonwoven web for use as a barrier layer in a fabric laminate where the nonwoven web has an average fiber diameter of from 1–3 microns and pore sizes in the range of 7 to 12 microns. Such a nonwoven web is obtained by forming a melt-blown web from a resin having a broad molecular weight distribution and having a high melt flow rate, where the resin is modified by addition of a small amount of peroxide prior to processing. Generally a polymer with a molecular weight distribution ($M_w/M_n$) of 4–4.5 and a melt flow rate of about 400 g/10 min at 230° C. Using the peroxide disclosed the $M_w/M_n$ is reduced to a range from 2.2 to 3.5 and the melt flow rate increases to a range of 800–5000 g/10 min at 230° C. Disclosed as suitable polyolefins are polypropylenes, polyethylenes or other alpha-olefins polymerized with Ziegler-Natta catalyst technology.

Polymers such as polyamide and polyester exhibit cold flow resistance that is generally greater than the cold flow resistance of most polyolefins. This cold flow resistance enables polyamides, polyesters and other such thermoplastics to be used in fiber-type applications that are substantially foreclosed to polyolefins, such as carpet, apparel, and fiber yarns. In apparel, the cold flow resistance and "drape" or "hand" of polyolefins is generally deficient to that of other thermoplastics, for instance the above mentioned polyamide or polyester. The cold flow resistance of conventional (i.e. Ziegler-Natta catalyzed) polyolefins is noticeably defensive to the thermoplastics discussed above. If conventional polyolefins are used in applications such as apparel, the apparel would show deformation after normal body movement, leading to an undesirable baggy look. Similarly, the drapeability and strength of conventional polyolefin fabrics limits their use in medical drapes, because the combination of required "form fitting" of a drape over, for example surgical tray, requires good drape, while the same surgical tray will often have sharp edges requiring strength of the fabric to prevent punctures.

The less desirable drape or hand of polyolefins compared to polyamides or polyesters, gives a stiff or "boardy" look and feel to polyolefin fabrics and may impair functionality where drape or drapeability are important. These are unacceptable in general apparel applications where aesthetics are relatively important.

There is therefore a need for a polyolefin, specifically a polypropylene copolymer that will yield a soft, drapeable fabric and will resist cold flow to a sufficient extent that it could replace polyamides or polyesters in many fiber applications.

SUMMARY OF THE INVENTION

It has been discovered that propylene copolymers made utilizing metallocene catalyst systems to polymerize propylene with α-olefin comonomers having 5 or more carbon atoms (higher α-olefins (HAO)), show a surprising enhancement in important physical properties when compared to propylene copolymers utilizing ethylene or alpha-olefins of 4 carbon atoms or less (for purposes of this application, this classification includes ethylene). The most striking step change is evidenced in an embodiment of the present invention in high strength, toughness, and improved cold flow or creep resistance values for articles fabricated from propylene-HAO copolymers.

In an embodiment of the present invention, fibers, fiber bundles, fabrics, and articles made therefrom are comprised of a copolymer of propylene and an HAO. The HAO is present in the copolymer in the range of from about 0.2 to about 6 mole percent, based on the total moles of monomer in the copolymer. The copolymer will have a $M_w/M_n \leq 5$ and a peak melting point determined on a Differential Scanning Calorimeter (DSC) in the range of from about 100° C. to about 145° C. An article made from these copolymers or their compounds can exhibit improved creep or cold flow resistance when compared to articles based on propylene-ethylene copolymers.

Thus it can be seen that articles made from the copolymers of an embodiment of the present invention will be particularly useful in applications where minimizing cold flow or creep is important.

BRIEF DESCRIPTION OF THE DRAWINGS

These and other features, aspects, and advantages of the present invention will become better understood with regard to the following description, appended claims and accompanying drawings where:

DESCRIPTION OF THE PREFERRED EMBODIMENTS

Figure 1:
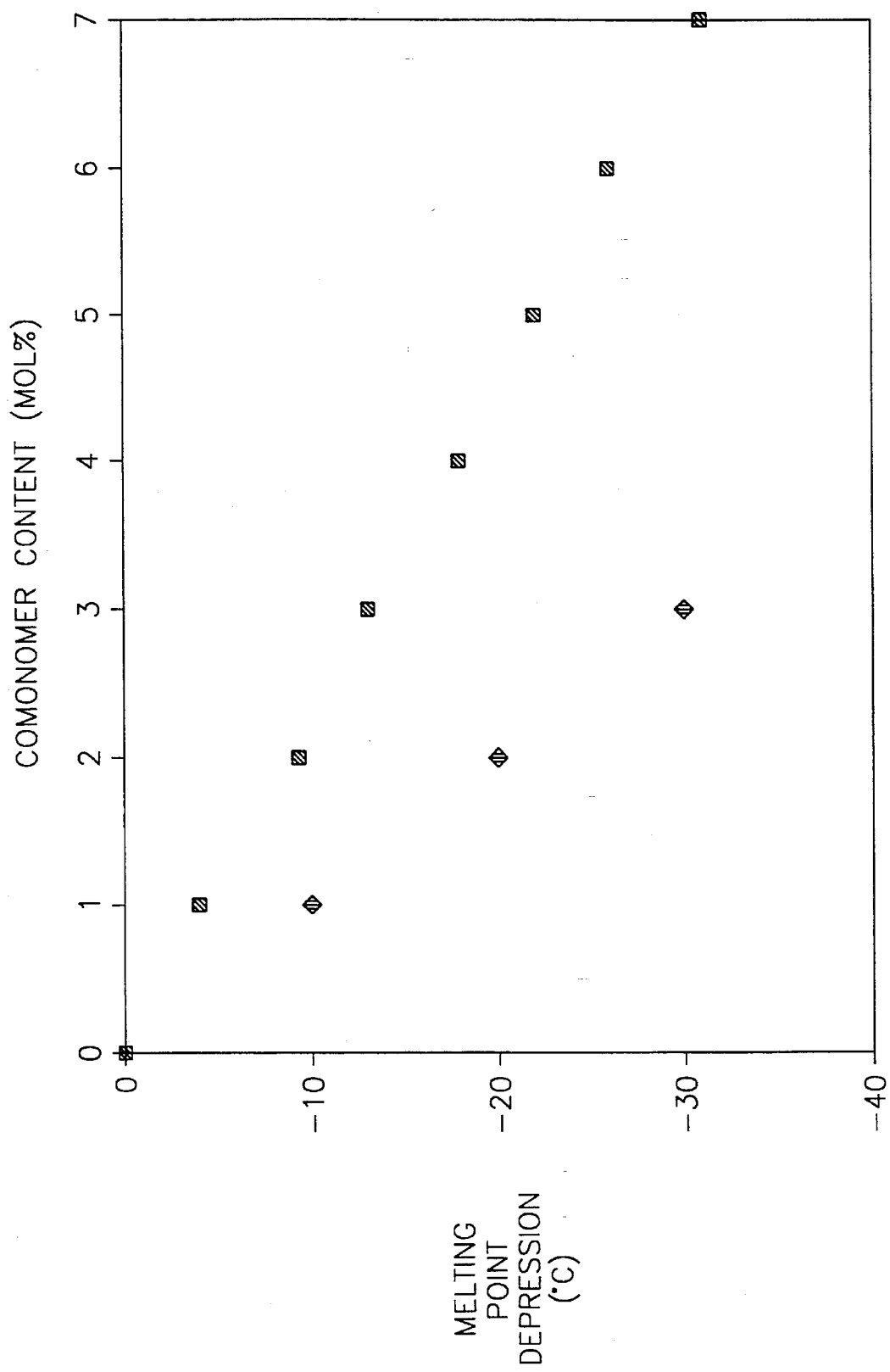
FIG. 1 shows the effect of comonomer on melting point depression in a propylene copolymer.

The present invention concerns certain classes of fabricated polypropylene articles, and their uses. These articles have unique characteristics which make them well suited for use in certain applications. Fibers, fabrics, and oriented films, as well as articles made therefrom, utilizing propylene-HAO copolymers (metallocene catalyzed) have superior cold flow (creep) resistance, high strength, and toughness that renders them superior articles made from polypropylene-ethylene copolymers. A detailed description follows of certain preferred resins for use in fabricating articles within the scope of our invention, and preferred methods of producing these resins and their products.

Those skilled in the art will appreciate that numerous modifications to these preferred embodiments can be made without departing from the scope of the invention. For example, though the properties of fibers, fabrics, and oriented films are used to exemplify the attributes of the copolymers, the copolymers have numerous other uses. To the extent that our description is specific, this is solely for the purpose of illustrating preferred embodiments of our invention and should not be taken as limiting our invention to these specific embodiments.

For purposes of this discussion, the term "statistical copolymer" refers to a polymer formed from two or more distinct monomers, that is one whose composition is not substantially influenced by a previous event during the polymerization. This is sometimes known as Bernoulian distribution. In a preferred embodiment these copolymers are prepared in a reaction medium where the comonomers are homogeneously distributed and where the concentrations of the various comonomers are substantially constant during the reaction. Variations in the composition of the resulting copolymers due to the existence of chemically distinct sites within the catalytic entity from which they are prepared or to normal variations experienced in sequenced reactors, as long as the resulting "reactor blend" polymers are miscible in the melt, are accepted in the current definition. The term "random copolymer" is sometimes applied to products of this class. As used in this application, the term polypropylene statistical copolymer shall mean all isotactic copolymers with a majority propylene component, and one or more alpha-olefins. Such polymers are also considered part of this new class, provided that at least one of the alpha-olefins is an HAO.

We have discovered that certain metallocene catalyst systems can be used to polymerize propylene statistical resins having properties which are highly desirable for conversion into various products. Generally these resins are isotactic polypropylene statistical copolymers and homopolymers, the copolymers utilize propylene and one or more alpha-olefins. For purposes of this application, the term isotactic is intended to mean a polymer where propylene tacticity distribution will be greater than about 90 percent mmmm pentads, where m is a meso diad, (m is defined as the same relative configuration of methyl groups of two successive monomer units (diad) to each other), preferably in the range of from about 94 to about 98 percent mmmm pentads, most preferably in the range of from about 95 to about 97 percent mmmm pentads, as determined by nuclear magnetic resonance (NMR).

Production of the Resins

The polypropylene copolymers of the present invention are generally produced using supported metallocene catalysts. The copolymers may be produced in many types of reactors or reaction schemes, including, but not limited to, fluidized bed or stirred bed gas phase reactors, slurry or bulk liquid reactors of tank or loop type or any other processes practiced for the polymerization of propylene. Series (2) bulk boiling liquid propylene pool reactors are preferred.

Specific metallocene-type catalysts are known to be useful for producing isotactic olefin polymers may be found in, for example, EP A 485 820, EP A 485 821, EP A 485 822, EPA 485 823, by Winter, et al. and U.S. Pat. No. 5,017,867 by Welborn. These publications are incorporated by reference for purposes of U.S. patent practice, in the present application.

Various publications describe placing catalyst systems on a supporting medium and use of the resulting supported catalysts. These include U.S. Pat. Nos. 5,006,500, 4,925, 821, 4,937,217, 4,953,397, 5,086,025, 4,912,075, and 4,937, 301 by Chang and U.S. Pat. Nos. 4,808,561, 4,897,455, 5,077,255, 5,124,418, and 4,701,432 by Welborn, all of which are incorporated in the present application by reference for purposes of U.S. patent practice.

Specific information on the use of support techniques for metallocene-type catalysts, for use in the preparation of propylene-alpha-olefin polymers may be found in U.S. Pat. No. 5,240,894, by Burkhardt, also incorporated by reference for the purpose of U.S. patent practice. While catalysts used for the following examples were employed in a bulk liquid-phase polymerization, Catalysts for commercial use may be used in other processes including for example, gas phase and slurry processes.

Resins produced by the above referenced processes and catalysts can incorporate alpha-olefin comonomers in the range of from about 0.2 mole percent to about 6 mole percent based on the total moles of the copolymer. Above about 6 mole percent, the resulting resin will make an oriented film or fiber with a melting point too low for many preferred applications. Below about 0.2 mole percent comonomer, the flexural modulus becomes too high, leading to a fabricated product that is too stiff for many applications. In a more preferred embodiment, the alpha-olefin comonomer is present in the range of from about 0.5 to about 4 mole percent. In a most preferred embodiment the alpha-olefin is present in the range of from about 0.5 to about 3 mole percent. In the most preferred embodiment, the alpha-olefin is present in the range of from about 1 to about 3 mole percent.

In one preferred embodiment, the catalyst system comprises a silicon bridged bis(substituted 2-methyl-indenyl) zirconium dichloride or a derivative thereof, methyl alumoxane and an inorganic support. In a more preferred embodiment, dimethyl silyl bis(2-methyl-benzindenyl)zirconium dichloride is the metallocene of choice. This preferred catalyst system was used to generate the propylene-ethylene and propylene-hexene resins used in the films whose properties are shown in Table 1. However, it would be possible to copolymerize most any alpha-olefin of 2 to 20 carbon atoms utilizing these and similar catalyst systems.

Further details regarding preparation of the catalyst system and production of the resin are provided in the examples that follow.

Characteristics of the Resins

Molecular Weights

In a preferred embodiment the polymers are isotactic in nature. The polymers will generally have a narrow molecular weight distribution, as characterized by the $M_w/M_n$ (weight average molecular weight/number average molecular weight) (molecular weight distribution MWD), $\leq 5$. Preferably $\leq 2.5$, more preferably $\leq 2.5$, and most preferably $\leq 2.2$. Mw/Mn (MWD) is determined by Gel Permeation Chromatography (GPC), as are molecular weight and polydispersity index. Such techniques are well known. The techniques are fully described in co-pending application U.S. Ser. No. 08/164,520 incorporated herein by reference for purposes of U.S. patent practice. The polymers will exhibit melting points in the range of from about 100° C. to about 145° C., more preferably, in the range of from about 110° C. to about 135° C., most preferably in the range of from about 115° C. to about 135° C.

Food law compliance can be an important criterion for articles made from these resins, such compliance usually directly affected by the extractable content of an article made from a resin. A standard of U.S. Food and Drug Administration as noted in 21 CFR §177.1520 is to use the n-hexane reflux procedure, the maximum extractables level of the products of the present invention is expected to be less than about 5 wt %, preferably less than about 4 wt %, most preferably less than about 3 wt %.

Useful melt flow rates of the polymers of the present invention are in the range of from about 0.1 to about 5000 dg/min. In a preferred embodiment, the melt flow rates are in the range of from about 1 to about 10 for films, and in the range of from about 10 to about 3000 dg/min for fibers and nonwoven fabrics. More preferred for spunbonded fabrics and fibers is a melt flow rate of 10–200 dg/min. More preferred for melt blown fabrics is 800–2500 dg/min. Melt flow rates are measured by ASTM D-1238 condition L.

Making an Oriented Film

Films may be made by any techniques known by those of ordinary skill in the art. For example, blown films produced with an annular die and air cooling, or sheet and cast films made using a slot die and a chill-roll for cooling are both among the acceptable techniques. Oriented films may be produced by, for example, either post extruder manipulation of the blown film through heating and orientation, or by post extruder tentering of film or sheet. Films are generally in the range of from about 0.2 mils to about 10 mils (5.08 μm to 254 μm).

Films made from the products of an embodiment of the present invention may be used to contain food articles such as meat and snacks for instance. Such films may also be used to protect and display articles of apparel.

In addition, to better cold flow resistance, these propylene HAO copolymers exhibit other improved physical properties. Table I compared physical properties of films of propylene copolymers of ethylene with those of propylene-HAO copolymer. It is seen that ultimate tensile, and impact strength for example, are significantly improved.

A further indication of the fact that the class of propylene-higher alpha-olefin copolymers is distinct from the ethylene and butene propylene copolymer class, is found in the response of the melting points of the copolymers to monomer incorporation. This is illustrated in FIG. 1. It can be seen that the melting point depression as a function of comonomer incorporation is roughly twice as much for the propylene-higher α-olefin copolymers as for the ethylene and butene resin class of propylene copolymers.

Fibers and Fabrics

Making Oriented Fibers and Fabrics

In an embodiment of the present invention, novel fibers may be formed by any method in which a fiber is formed from molten polymer, including traditional melt-spinning, of fibers as yarns as well as spunbonding processes, and melt blowing; or by non-traditional methods including centrifugal spinning, sheet slitting and film fibrillation.

The fiber and subsequently fabrics (such as nonwoven fabrics), when made in a typical process from the copolymers of the present invention, will generally yield a softer fabric than one made from a propylene homopolymer due to the reduced modulus of the copolymer and to the finer fibers achievable in such a process with the narrow MWD of the copolymers of the present invention. The fibers and fabric will be stronger and exhibit improved cold-flow resistance when compared to a similar fabric made from propylene-ethylene copolymers. These tougher, stronger, creep resistant fibers may be used to make textiles such as knitted woven and nonwoven fabrics. Additionally, fibers made by blending other thermoplastic polymers with a propylene-HAO copolymer and/or fibers made with various additives including, pigments, anti-static agents, antioxidants or other additives are also contemplated.

Determination of $R_{ms}$ (Fiber and Fabric Testing)

Creep or cold flow resistance has been discussed above for films, molded articles, tubing, and sheets. For fibers and fabrics, the same physical property is indicative of other physical property step changes. However, the creep or cold flow resistance is measured with a different test.

The creep value of fibers or fiber bundles or fabrics (hereinafter referred to as "fibers") as used in this application is the time of creep under a constant load to a 10% deformation ($t_{10\%}$).

The step change in properties between fiber made from propylene-HAO copolymers and propylene-ethylene copolymers (both being formed in the presence of metallocene catalysts) can be best seen by using a technique similar to that described above for films and other articles.

The technique uses the quotient of the $t_{10\%}$ of a propylene-HAO copolymer, divided by the $t_{10\%}$ of a propylene-ethylene copolymer. The tensile modulus of the fibers should be substantially the same.

The quotient in this instance is given the symbol $R_{ms}$. Where:

$$R_{ms} = \frac{t_{10\%} \text{ of a propylene-}HAO \text{ copolymer fiber}}{t_{10\%} \text{ of a propylene-ethylene copolymer fiber}}$$

In the determination of $R_{ms}$, it is important that substantially all parameters that affect the physical properties of the articles in both the numerator and denominator of the factor be the same.

Such factors include, but are not limited to:
for the resins: molecular weights should vary by no more than 10%
for the fabricated article:
  fabrication conditions and techniques' denier of the fibers;
  post fabrication treatments;
  blend components; or additives It will be understood by those of ordinary skill in the art that comonomer content of either HAO or ethylene can be varied for purposes of attaining substantially the same tensile modulus in both the propylene-HAO and propylene-ethylene copolymers. Testing is accomplished as follows:

The fibers samples are conditioned for three days at 22° C. and 50% relative humidity. A predetermined load of 1 g/denier is applied and elongation measured as a function of time.

We contemplate $R_{ms}$ values of at least about 1.1, preferably at least about 1.2, more preferably at least about 1.3. Most preferably at least about 1.5.

Fabrics

Fabrics may be tested in a way substantially similar to the tests for fibers, except that instead of a fiber bundle a 15 mm fabric strip is used. The fabric strip are cut from a fabric of known weight, most commonly, fabrics of 40 g/m² (or about 1 oz/yd2).

The $R_{ms}$ results will be similar to those of fiber bundles. That is they will be at least about 1.1, preferably at least about 1.2, more preferably at least about 1.5.

Properties of Oriented Fibers and Oriented Films

Example 1

Preparation of Metallocene Catalyst

A silica supported metallocene catalyst was prepared according to the teachings of U.S. Pat. No. 5,240,894 using dimethyl silyl, bis(2 methyl, 4,5 benzindenyl)zirconium dichloride as the metallocene as described in *OrganoMetallics*, v. 13, No. 3, 1994, p. 954–963. The catalyst recipe was 400 grams of silica (Davison 948), 10 grams of metallocene and 3 liters of 10 wt % MAO in toluene solution. Approximately 600 grams of the finished catalyst system was recovered. This catalyst was prepolymerized with one weight of ethylene per weight of catalyst system at a temperature of about 15° C. The ethylene was added over a period of 1.5 hours to assure slow reaction rate.

Example 2

Preparation of Propylene-Ethylene Copolymers

Approximately 15 grams of ethylene and 550 grams of propylene were added to an autoclave maintained at 30° C. After allowing time for equilibration, 0.2 grams of the prepolymerized catalyst of example 1 was added to the reactor and the temperature raised to 50° C. over a period of several minutes. An immediate reaction was observed. The reaction was terminated after 30 minutes to limit the extent of conversion of the ethylene so that its concentration in the reaction medium would be nearly constant over the period of the reaction. A total of 114 grams of propylene-ethylene statistical copolymer was obtained. Its weight average molecular weight as measured by size exclusion chromatography was 184,000, its ethylene content (measured by FTIR) was 3.3 wt %, and its peak melting point was 121° C.

Example 3

Preparation of Propylene-1-Hexene Copolymers

To the autoclave of Example 2 was added 550 grams of propylene and 34 grams of hexene-1. The catalyst of Example 1 was added (0.2 grams) and the temperature controlled as in Example 2. The reaction was allowed to run for a total of two hours in this case since the relative reactivities of propylene and hexene-1 are nearly the same under these conditions. A total of 222 grams of propylene-hexene statistical copolymer was obtained. Its weight average molecular weight as measured by size exclusion chromatography was 204,000, its hexene-1 content was 2.9 wt % (measured by FTIR), and its peak melting point was 126° C.

Example 4 (Prospective Example)

Preparation of Propylene 1-Octene Copolymers

To the autoclave of Example 2, 550 grams of propylene would be added along with approximately 45 grams of 1-octene as the molar amount of Example 3. The catalyst of Example 1 would be added and the temperature would be controlled as in Example 2. The reaction would be allowed to run for 2–3 hours as the reactivities of propylene and 1-octene would be nearly the same under these conditions. Over 200 grams of propylene-octene statistical copolymers could be expected. The average molecular weight as measured by size exclusion chromatography would be over 200,000. The octene-1 content would be expected to be between 2.5 and 4 wt % (if measured by FTIR), and its peak melting point would be in the range of 125°–130° C.

Example 5 (Prospective Example)

Production of Fibers

Fiber and Fabric Formatoin Examples

Fibers are prepared as spun, partially oriented yarns (POY) by mechanical take-up of the fiber bundle from its extruded melt. This is accomplished on a fiberline assembled by J. J. Jenkins, Inc. (Stallings, N.C.). The line consists of a 5 cm (2 inch) Davis Standard Extruder (with 30:1 length/diameter ratio) and 6 cc/rev Zenith metering pump forcing molten polymer through a spinnerette plate of 72 holes of 0.6 mm and 1.2 length/diameter ratio. A metering pump rate of 10 rpm is employed which will yield a through-put of 0.625 g/hole/minute.

Fibers are taken up from the 232° C. (450° F.) melt by an axially spinning unheated godet at 3000 m/min. The fiber bundle, expressed as total denier/total filaments collected would be 135/72. The fiber bundles are collected for characterization as five minute runs by a Leesona winder.

The fiber bundle tenacity (g/denier) and elongation are measured by pulling to break on an Instron. Fiber testing is performed on an Instron machine, Model 1122 coupled with the Instron computer which supports the Sintech Sima (Testworks II~) computerized system for material testing. Instron Pneumatic Cord and Yarn Grips (Model 2714) are used for gripping the samples. A sample with 2.5 cm (1 inch) gauge and 0.1 gram preload is pulled at 500 mm/min to break. Break sensitivity will be 95% drop in force.

Example 6 (Prospective Example)

Creep Testing of Fiber Bundles

Creep experiments would be performed in a room with controlled atmosphere (20° C., 50% RH) by measuring the fiber bundle elongation versus time under an applied dead load. The length of the fiber bundle from suspension point to load would be 0.60 m on which gauge length marks of 0.50 m were made after application of a small pre-tension. Dead loads are hung in individual experiments on the fiber bundle corresponding to about 20 to 50% of the g/denier. Creep data are recorded in percent elongation versus time under loads expressed in g/denier. Loads are chosen in order to perform the creep experiments in a practical time, that is within a few hours. Extension is reported as time to creep under a constant load to 10% creep or $t_{10\%}$.

Creep experiments are summarized by parameter: $t_{10\%}$, that is the time required for obtaining a 10% elongation. $T_{10\%}$ is sample and dead load dependent. In order to compare different samples, a constant dead load is ideally used. This is, however, impractical because of the large dependence of creep rate with applied load. More than 2 loads are tested so that creep experiments may be extrapolated to a standard dead load of 1 g/denier.

Although the present invention has been described in considerable detail with reference to certain preferred versions thereof, other versions are possible. For example, knitted fabrics, staple fiber, monofilaments, yarns, woven or knitted yarns, nonwoven, meltblown, randomly dispersed, spunbonded, and other versions are possible. Therefore, the spirit and scope of the appended claims should not be limited to the description of the preferred versions contained herein.

TABLE I

| Polymer | Copolymer of Example 2 | Copolymer of Example 3 |
|---|---|---|
| Tensile Modulus (MPa) | 880 | 900 |
| $R_{ma}$ | 1.0 | 1.68 |
| Tensile Strength (Ultimate - MPa) | 38.0 | 43.7 |
| Dart Impact Strength (Nm/mm) | 12.5 | 14.0 |
| Peak Melting Point (DSC) °C. | 121 | 126 |

We claim:

1. An article comprising a copolymer of propylene and at least one alpha-olefin, said alpha olefin having 5 or more carbon atoms;

said α-olefin being present in the range of from about 0.2 to about 6 mole percent based on the total moles of monomer in said copolymer, said copolymer having a $M_w/M_n \leq 5$, said copolymer having a melting point in the range of from about 100° C. to about 145° C.;

wherein said article has an $R_{ms}$ exceeding about 1.1.

2. The article of claim 1 wherein said copolymer is isotactic.

3. The article of claim 1 wherein said alpha-olefin is selected from the group consisting of α-olefins containing 5 to 20 carbon atoms.

4. The article of claim 1 wherein said copolymer further comprises a second comonomer, said second comonomer being selected from the group consisting of α-olefins containing from 2 to 20 carbon atoms.

5. The article as recited in claim 1 wherein said article further comprises a second thermoplastic, wherein said second thermoplastic is selected from the group consisting of polyamide, polyester, and acrylates.

6. The article of claim 1 wherein said propylene copolymer is produced using a metallocene catalyst system.

7. The article of claim 6 wherein said metallocene catalyst system includes a silicon bridged bis (substituted 2-methyl-indenyl) zirconium dichloride.

8. The article of claim 6 wherein said metallocene catalyst system includes dimethyl silyl bis (2-methyl-benzindenyl) zirconium dichloride and a methylalumoxane activator.

9. The article of claim 1 wherein said fiber has an $R_{ms}$ exceeding about 1.3.

10. The article of claim 1 wherein said fiber has an $R_{ms}$ exceeding about 1.5.

11. The article of claim 1 wherein said α-olefin is present in the range of from about 0.5 to about 3 mole percent.

12. The article of claim 1 wherein said copolymer has an $M_w/M_n \leq 2.2$.

13. The article of claim 1 wherein said article is selected from the group consisting of a fiber, a fiber bundle, and a fabric.

14. The article of claim 3 wherein said α-olefin is selected from the group consisting of 1-hexene, 4-methyl-pentene-1, and 1-octene.

15. The article of claim 1 wherein said article is an oriented film.

16. The article of claim 1 wherein said article is an article of apparel.

17. An article comprising at least a first propylene α-olefin copolymer, said α-olefin being selected from the group consisting of 1-hexene, 4-methyl-pentene-1, and 1-octene;

said copolymer being made utilizing a metallocene-alumoxane catalyst system, said alumoxane being a methyl alumoxane;

wherein said α-olefin is present in the range of from about 1 to about 3 mole percent based on the total moles of monomer in said copolymer;

wherein said copolymer having a $M_w/M_n \leqq 2$;

said copolymer having a melting point in the range of from about 110° C. to about 135° C.; and said article having an $R_{ms}$ exceeding about 1.1.

* * * * *